July 28, 1953 — J. W. GANDEE — 2,646,636
TRANSPARENCY DISPLAY DEVICE
Filed July 15, 1950 — 2 Sheets-Sheet 1
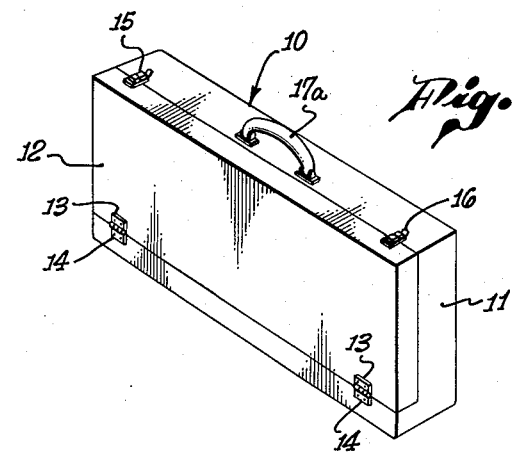
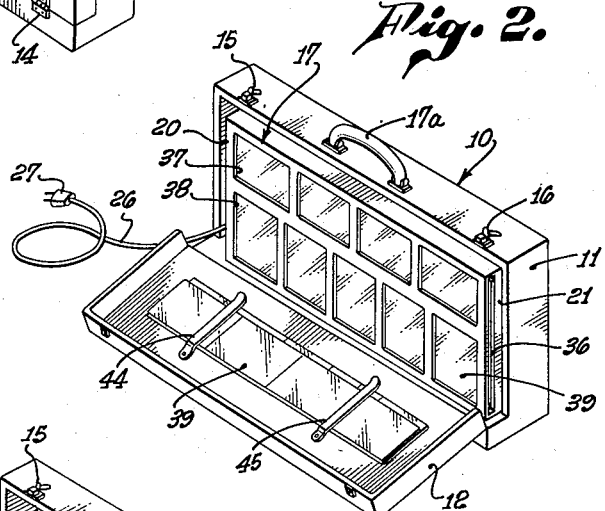
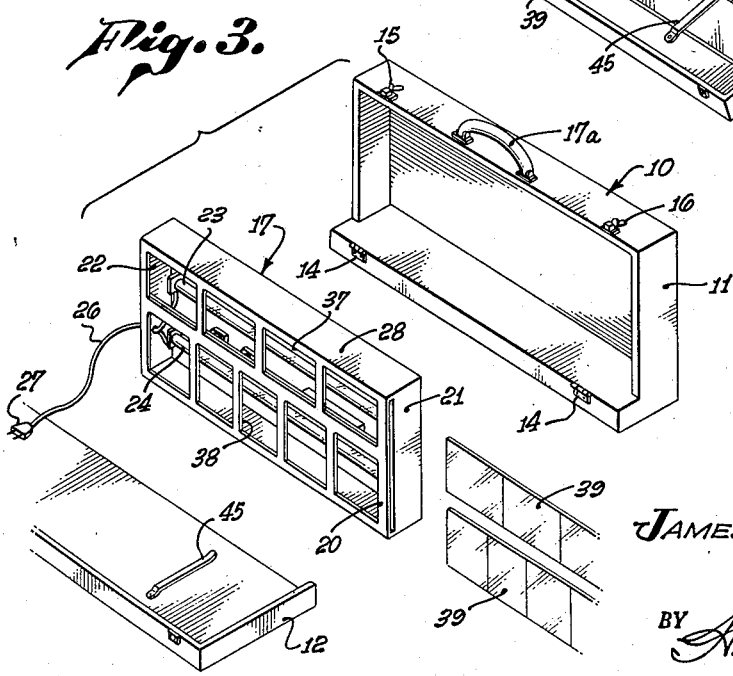
JAMES W. GANDEE,
INVENTOR.
BY
ATTORNEY.

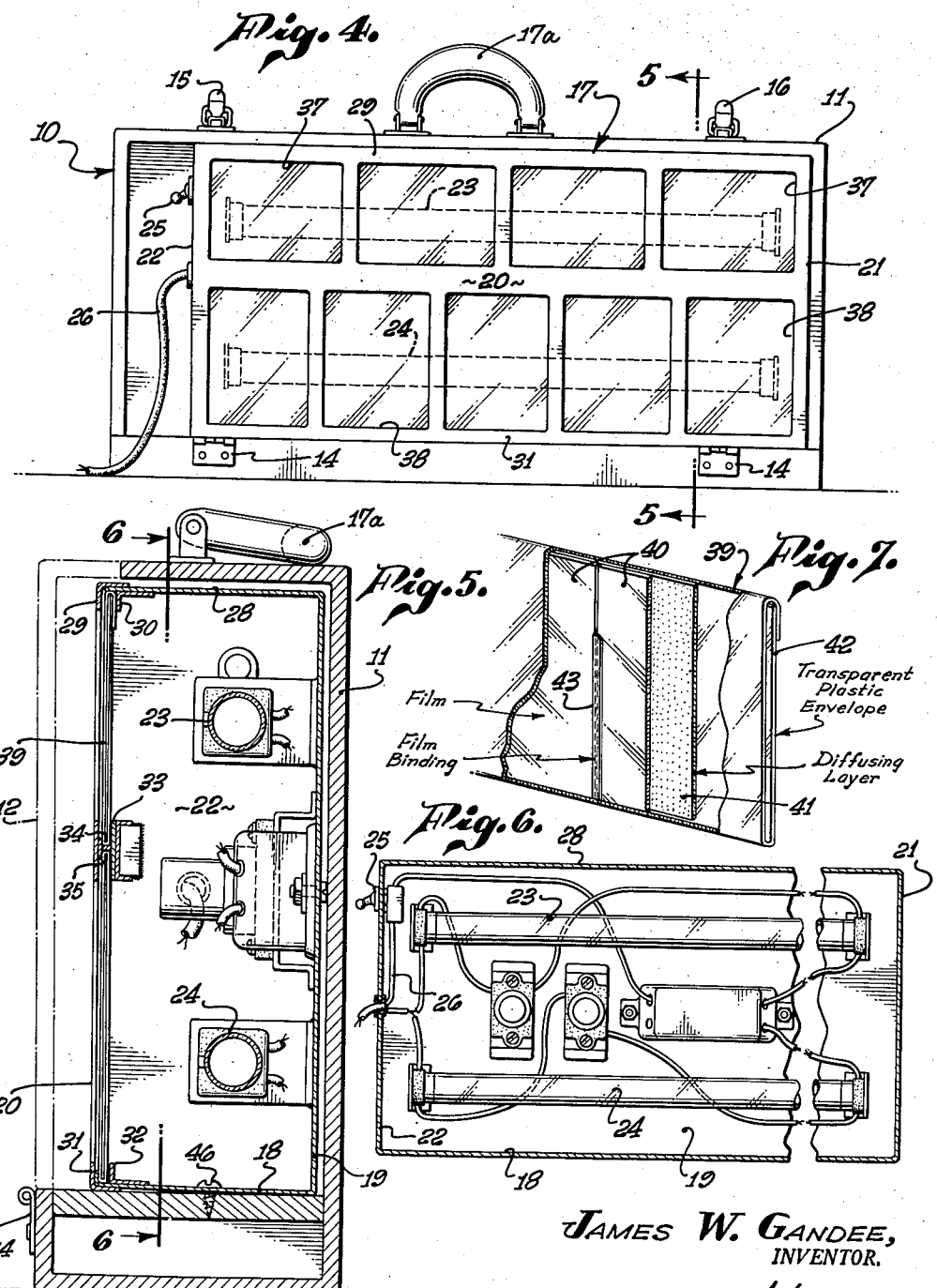

Patented July 28, 1953

2,646,636

UNITED STATES PATENT OFFICE 2,646,636

TRANSPARENCY DISPLAY DEVICE

James W. Gandee, Los Angeles, Calif.

Application July 15, 1950, Serial No. 174,041

1 Claim. (Cl. 40—64)

This invention relates to a transparency display device and more particularly to a device which is readily transportable for exhibiting successively series of individual transparencies protectively mounted in side by side relationship in display panels.

The general object of the invention is to provide such a transparency display device which has the constructional elements so arranged and disposed that a series of individual transparencies protectively mounted in display panels may be slidably and removably positioned in an appropriate guideway for viewing of the transparencies by an observer.

A further object of the invention is to provide a display device for exhibiting a series of transparencies which is simple and inexpensive to construct, but which will withstand severe service, particularly when the device is transported from locale to locale, as by a travelling salesman, and which is composed of a minimum of parts.

Another object of the invention is to provide a display device for exhibiting a series of transparencies which has the light source arranged in such a manner and of such a character that the objects portrayed in the transparencies are uniformly and brilliantly exhibited.

Another object of the invention is to provide a display device for exhibiting a series of transparencies in which a series of complementary individual transparencies are mounted in side by side relationship to form a single protective panel, the back of the panel acting as a light diffusor to produce a uniform and brilliant representation of the objects displayed in the individual transparencies when the panel is positioned in registry with the display openings within the device.

Another object of the invention is to provide a display device and carrying case for exhibiting a series of transparencies which is composed of a minimum of breakable parts and is of a size and construction to enable the device and the display panels to be conveniently transported from place to place and which is readily set up for use in a minimum of time and with a minimum of effort.

A further object of the invention is to provide a display device which is adapted to have slidably and removably positioned therein panels of transparencies, the panels being of a size and shape enabling a comparatively large number to be carried by a single individual, such as a travelling salesman, within a carrying case, which case also serves to enclose the display device.

A still further object of the invention is to provide a protective panel mount within which a series of individual transparencies are positioned in side by side relationship and having a backing sheet of translucent material, which panel may be handled without breakage, defacing or mutilation of the transparencies mounted therein despite successive and continuous use in connection with the transparency display device.

In the art of salesmanship it has been well known to exhibit to prospective purchasers, either at a salesroom or at the place of business of the prospective purchasers, samples of the articles or services sought to be sold. In the case of certain articles or services, even when the purchaser comes to the salesroom, difficulties have been encountered in representing accurately and effectively the article or service sought to be sold. Florists, for example, due to the perishability of floral displays, find it impossible or impracticable, to maintain actual samples of the work they can turn out for showing to prospective customers. In the case of interior decorators, floor space and facilities necessarily limit the number of actual interiors which can be displayed. In the case where the salesman travels to the place of business or home of the prospective purchaser other difficulties present themselves. Certain objects cannot be carried by salesmen due to bulk or breakability. For example, delicate ceramic objects when carried about by salesmen result in considerable expensive breakage; flowers for floral displays are perishable and bulky; and large objects cannot be carried about conveniently.

Transparencies, particularly color transparencies, have been used in the prior art for exhibiting such bulky or breakable objects and services. The constructions of the prior art for displaying such transparencies have been prohibitive in cost and complicated in construction. Further, the constructions of the prior art have not exhibited the transparencies to their full advantage by reason of the positioning of the source of light and the failure to obtain the maximum effectiveness of diffused light. Also the transparencies have not been mounted in such a manner that repeated and successive exhibitions were possible without destroying or mutilating the transparencies or breaking or distorting the frame in which the transparency was mounted. In general, the devices of the prior art have been concerned with a single transparency mounted in an individual frame.

The constructions of the prior art, in general, have been concerned with a display device which could be used only in a salesroom or show window and were inherently incapable of use by a travelling salesman. Some of these devices have utilized glass plates, either in the shadow box itself or within cumbersome frames in which the individual transparency was mounted. Such glass plates are breakable and cannot withstand the normal handling which salesmen's cases must undergo in use; they also add to the bulk and weight of the device itself, or the number of frames which must be carried to display the various items. Some display devices have utilized transparencies individually mounted in cardboard mountings. These become deformed and mutilated during handling and may not be used for repeated and successive viewings. Consequently, the devices of the prior art have not solved the problem.

In accordance with the present invention I provide, in general, a transparency display device comprising a carrying case having a hinged and removable cover member, a housing positioned within said case, said housing having a plurality of horizontal guideways, a plurality of aligned individual display openings in the front of said housing forming parallel horizontal rows of display openings, a plurality of lamps mounted in said housing remote from the front, and panels of protectively mounted individual transparencies backed with flexible translucent sheet material, said panels being adapted to be slid endwise into said guideways whereby the individual transparencies are aligned with said individual display openings.

In the accompanying drawings I have illustrated by way of example, but not by way of limitation, a specific embodiment of my invention. In such drawings Fig. 1 is a perspective view of a carrying case embodying my invention, the case being in closed position for ready transportation to the point of use. Fig. 2 is a perspective view of a transparency display device embodying my invention, the cover member being in the open position permitting the device to be used as a viewer. Fig. 3 is an exploded perspective view of a transparency display device embodying my invention, showing the various elements comprising the construction. Fig. 4 is a front elevation of the device, with the cover member disengaged from the body member. Fig. 5 is a vertical sectional view along the lines 5—5 of Fig. 4. Fig. 6 is a vertical sectional view along the lines 6—6 of Fig. 5. Fig. 7 is a fragmentary perspective of a transparency display panel.

Referring more particularly to the drawing in which similar reference characters identify similar parts in the several views 10 designates a carrying case which has a body portion or member 11 and a cover member 12. The cover member 12 is removably hinged to the body member 11 by the hinge members 13 and 14. Cooperative closure means, 15 and 16, of conventional construction are provided to retain the cover member 12 in closed position when desired, as shown in Fig. 1. As shown in Fig. 1, my invention is of such a size and construction that it may be readily transported. A handle 17a is provided so that the device may be carried about in the manner of a conventional suitcase.

Positioned within the carrying case 10 is a housing 17 which, in the embodiment illustrated, is of rectangular cross section. The housing 17 has a bottom 18, a back 19, a front 20 and sides 21 and 22. As shown more particularly in Fig. 6 two fluorescent lamps 23 and 24 are mounted within said housing 17 acting as a light source. The wiring and associated devices for the circuit are conventional and will not be described in detail herein. On the side 22 of the housing 17 a switch 25 is provided enabling the power coming in through the line 26 to be turned on or off as desired. A conventional plug 27 is provided of standard size to fit a conventional power socket.

As shown in Fig. 5, the front edge of the top 28 of the housing 17 is bent downward to form a flange 29. A downwardly depending flange member 30 is provided to the rear of the flange 29, the flange 29 and the flange member 30 acting to form an upper guideway. The front edge of the bottom 18 of the housing 17 is bent upward to form a flange 31. An upwardly extending flange member 32 is provided to the rear of the flange 31, the flange 31 and the flange member 32 acting to form a lower guideway. Intermediate the upper guideway formed by the flange members 29 and 30 and the lower guideway formed by the flange members 31 and 32 an H-shaped member 33 is affixed, as by welding, to the sides 21 and 22. The H-shaped member 33, as shown in Fig. 5 is of a configuration to form an upturned channel 34 and a downwardly facing channel 35. The H-shaped member 33 and its upturned channel 34 cooperates with the upper guideway formed by the flange 29 and the flange member 30 to form a panel receiving guideway. The H-shaped member 33 and its downwardly facing channel 35 cooperates with the lower guideway formed by the flange members 31 and 32 to form a panel receiving guideway.

The side 21 of the housing 17 is provided with a vertical slot 36, providing access to the guideways described above. The front 20 of the housing 17 is provided with a plurality of apertures or display openings 37 and 38. As shown particularly in Fig. 4 the apertures 37 may have a horizontal axis and the apertures 38 a vertical axis. The apertures or display openings 37 are disposed to form a horizontal row and the lamp 23 is substantially parallel with the row thus formed and is substantially coextensive with the length of the row of display openings 37. The apertures or display openings 38 are disposed to form a horizontal row and the lamp 24 is substantially parallel with the row thus formed and is substantially parallel with the upper lamp 23 and substantially coextensive with the length of the row of display openings 38.

Panels 39 may be slid endwise through the vertical space 36 of the end or side 21 of the housing 17. As shown more particularly in Fig. 7 the panels 39 are protective mounts for transparencies 40.

Transparencies, particularly color transparencies, are very effective visual means for exhibiting goods or services. Reproductions on film are vivid and brilliant when displayed to their full advantage. I have found that transparencies become mutilated and defaced if successively and continuously used with the result that later displays are not effectively illustrated. I have also found that the light must be properly distributed and diffused in order to obtain clarity in exhibition. I have also found that maximum effectiveness in display of a line of goods is obtained by illustrating the goods in side by side relationship. In my invention I mount the transparencies 40 in side by side relation. Some goods or services are better photographed and displayed with a horizontal axis while others are more effective with a vertical axis. Thus the guideways, as shown in Fig. 5, are of two sizes to accommodate panels 39 of two sizes, one size in which the transparency has a vertical axis and the other in which the transparency has a horizontal axis. Similarly the apertures or display openings 37 have a horizontal axis while the display openings 38 have a vertical axis.

In the display panel, as shown in Fig. 7, a series of transparencies 40 are horizontally aligned in side by side relationship. A backing sheet 41 of translucent material, such as translucent cellulose acetate is positioned as shown to the rear of the transparencies 40. I have found that from 10 to 15 gauge translucent cellulose acetate diffuses the light for maximum effectiveness. Enclosing the transparencies 40 and the backing sheet 41 I provide a transparent envelope of sheet material or protective sheet 42. I have found that transparent cellulose acetate of approximately 10 gauge is effective for protection of the transparencies and gives a clear and brilliant display of the transparencies 40 in my invention. Opaque strips of sheet material or film binding 43 are utilized to define the display area of the individual transparencies 40. The strips 43 may also be used to seal the edges of the panel 39.

As shown in Fig. 2, a number of panels 39 may be carried by the salesman in the carrying case 10. The cover member 12 is provided on its interior face with clips 44 and 45 made of spring material. The panels 39 are thus carried about within the case 10.

As shown in Fig. 3 the display device may be utilized in a showroom, for example, without the use of a carrying case 10. If such use is desired the housing 17 is merely placed at the spot where viewing is desired, which may be any position convenient to a source of electricity. If the housing 17 is to be carried in the carrying case 10 the housing 17 may be affixed to the case 10 by means of the screw 46, as shown in Fig. 5.

In the operation of my invention the transparency display device is carried by the salesman to the locale of the prospective purchaser with the case 10 in closed position, as shown in Fig. 1. At a point convenient to a source of electricity the goods or services pictorially depicted on the transparencies 40 mounted in the panels 39 may be displayed. The case 10 is opened to display position by disengaging the closure means 15 and 16 and the cover member is opened as shown in Fig. 2 exposing the front 20 of the housing 17 and the display openings 37 and 38.

If desired the cover member 12 may be disengaged from the body member 11 as shown in Fig. 4. The hinge members 13 and 14 by which this is accomplished are conventional and known in the art. The plug 27 is then inserted into a convenient electric socket. The salesman then selects an appropriate display panel or panels 39 and inserts the panel into the appropriate guideway as described above. The transparencies 40 will register with the display openings 37 and 38. The switch 25 is snapped on and the lamps 23 and 24 are energized. The light thus produced is diffused by means of the backing sheet or diffusing layer 41 providing a clear and brilliant display.

While I have described a particular embodiment of my inventive structure it is obvious that various changes therein may be made without departing from my invention.

I claim:

In a portable transparency display device, a carrying case comprising a rectangular box having side and end walls the forward edges of which lie in a common plane defining a front opening, a housing within said case having a front wall provided with a horizontal series of display openings, means forming a horizontal guideway for a slide panel, back of said front wall and contiguous thereto, the forward part of said housing, including said series of display openings and said guideway, projecting forwardly of the plane of the front opening of said case whereby lateral access is had to said guideway for the insertion of a panel of transparencies so positioned as to register with said display openings, a light source within said housing, and a cover member for said case hinged thereto at the bottom and of sufficient depth to contain the projecting part of said housing, when closed.

JAMES W. GANDEE.

References Cited in the file of this patent

UNITED STATES PATENTS

| Number | Name | Date |
|---|---|---|
| 1,413,507 | Turner | Apr. 18, 1922 |
| 1,559,665 | Beery et al. | Nov. 3, 1925 |
| 1,629,104 | Honey | May 17, 1927 |
| 1,882,534 | Walton | Oct. 11, 1932 |
| 2,227,898 | Grant | Jan. 7, 1941 |
| 2,258,986 | Hutchinson | Oct. 14, 1941 |
| 2,271,530 | Wick | Feb. 3, 1942 |
| 2,296,272 | De Sherbinin | Sept. 22, 1942 |
| 2,534,561 | Silver | Dec. 19, 1950 |